United States Patent
Nagata et al.

(10) Patent No.: US 6,855,779 B1
(45) Date of Patent: Feb. 15, 2005

(54) HIGH SOLID EPOXY, MELAMINE AND ISOCYANATE COMPOSITIONS

(75) Inventors: Isao Nagata, Troy, MI (US); Peter William Uhlianuk, Romer, MI (US); Donald A. White, Auburn Hills, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,574

(22) PCT Filed: Mar. 16, 2000

(86) PCT No.: PCT/US00/06960

§ 371 (c)(1),
(2), (4) Date: Aug. 13, 2001

(87) PCT Pub. No.: WO00/55231

PCT Pub. Date: Sep. 21, 2000

Related U.S. Application Data

(60) Provisional application No. 60/131,146, filed on Apr. 27, 1999, provisional application No. 60/131,145, filed on Apr. 27, 1999, and provisional application No. 60/124,850, filed on Mar. 17, 1999.

(51) Int. Cl.[7] .................... C09D 161/28; C09D 163/00; C09D 175/00; C08L 61/28; C08L 63/00
(52) U.S. Cl. .................... 525/510; 427/385.5; 427/386; 428/413; 428/423.1; 525/454; 525/462; 525/463; 525/467; 525/528; 528/45; 528/73
(58) Field of Search .................... 427/385.5, 386; 428/413, 423.1; 525/454, 462, 463, 467, 510, 528; 528/45, 73

(56) References Cited

U.S. PATENT DOCUMENTS

| | | | |
|---|---|---|---|
| 3,928,299 A | 12/1975 | Rosenkranz et al. ............ 96/33 |
| 3,954,900 A | 5/1976 | Schmalz et al. ............ 525/440 |
| 4,064,110 A | 12/1977 | Arlt et al. ..................... 526/16 |
| 4,315,091 A | 2/1982 | Steinberger et al. .......... 528/28 |
| 4,403,086 A | 9/1983 | Holubka et al. ............... 528/45 |
| 4,440,937 A | 4/1984 | Krimm et al. ............... 549/228 |
| 4,499,150 A | 2/1985 | Dowbenko et al. ......... 428/447 |
| 4,533,716 A | 8/1985 | Okoshi et al. ................ 528/73 |
| 4,632,964 A | 12/1986 | Altschuler et al. .......... 525/456 |
| 4,760,108 A | 7/1988 | Asano et al. ................ 524/451 |
| 4,772,666 A | 9/1988 | Just et al. .................... 525/185 |
| 4,820,830 A | 4/1989 | Blank ......................... 560/158 |
| 4,849,480 A | 7/1989 | Antonelli et al. ........... 525/303 |
| 4,960,828 A | 10/1990 | Higuchi et al. ............. 525/162 |
| 5,010,140 A | 4/1991 | Antonelli et al. ........... 525/269 |
| 5,051,473 A | 9/1991 | Tabuchi et al. ............. 525/100 |
| 5,059,670 A | 10/1991 | Harris ......................... 528/48 |
| 5,169,719 A | 12/1992 | Balatan ................... 428/423.1 |
| 5,182,174 A | 1/1993 | Stephenson ................ 428/450 |
| 5,230,962 A | 7/1993 | Stephenson ............. 428/423.1 |
| 5,279,862 A | 1/1994 | Corcoran et al. ........... 427/409 |
| 5,281,443 A | 1/1994 | Briggs et al. ................ 427/409 |
| 5,336,566 A | 8/1994 | Rehfuss ...................... 428/524 |
| 5,356,669 A | 10/1994 | Rehfuss et al. ............. 427/409 |
| 5,373,069 A | 12/1994 | Rehfuss et al. ............. 525/440 |
| 5,446,110 A | 8/1995 | Nakano et al. ............. 525/439 |
| 5,510,443 A | 4/1996 | Shaffer et al. ................ 528/45 |
| 5,512,639 A | 4/1996 | Rehfuss et al. ............. 525/456 |
| 5,527,879 A | 6/1996 | Nakae et al. ................ 528/371 |
| 5,646,213 A | 7/1997 | Guo ........................... 524/562 |
| 5,665,433 A | 9/1997 | Moussa et al. ............. 427/377 |
| 5,684,084 A | 11/1997 | Lewin et al. ................ 524/590 |
| 5,719,237 A | 2/1998 | Rehfuss et al. ............. 525/419 |
| 5,726,246 A | 3/1998 | Rehfuss et al. ............. 525/100 |
| 5,744,550 A | 4/1998 | Menovcik et al. .......... 525/162 |
| 5,747,590 A | 5/1998 | Corcoran et al. ........... 525/155 |

(List continued on next page.)

FOREIGN PATENT DOCUMENTS

| | | |
|---|---|---|
| DE | 4124688 A1 | 1/1993 |
| DE | 19529124 | 11/1996 |
| EP | 0017187 A1 | 10/1980 |
| EP | 0135741 B1 | 4/1985 |
| EP | 0179281 B1 | 4/1986 |
| EP | 0257848 A2 | 3/1988 |
| EP | 0272664 A2 | 6/1988 |
| EP | 0562577 B1 | 9/1993 |
| EP | 0708159 A2 | 4/1996 |
| FR | 2265828 A | 10/1975 |
| FR | 2392090 | 12/1978 |
| JP | 05271608 A | 10/1993 |
| JP | 06256714 | 9/1994 |
| JP | 07233348 | 9/1995 |
| JP | 10045867 | 2/1998 |
| WO | WO 9625466 A1 | 8/1996 |
| WO | WO 9634905 A1 | 11/1996 |
| WO | WO 9722647 A1 | 6/1997 |
| WO | WO 9827134 A1 | 6/1998 |
| WO | WO 9919411 A | 4/1999 |

OTHER PUBLICATIONS

Yasushi Nakate, Sep. 6, 1978, High–Solid Urethane Coating Compositions, JP53 102332 Translation, XP–002143021, 6001 Chemical Abstract vol. 90 (1979) No. 2, pp. 78.

Uses and Abuses of Photon Correlation Spectroscopy in Particle Sizing by Weiner et al. 1987 edition of American Chemical Society Symposium series, Chapter 3, pp. 48–61.

Ntsihlele et al, 1995, Journal of Applied Polymer Science, Cross–Linked Coatings by Co–Reaction of Isocyanate-Methoxymethyl Melamine System, vol. 55, No. 2, pp. 153–161.

*Primary Examiner*—Rabon Sergent
(74) *Attorney, Agent, or Firm*—Sudhir G. Deshmukh

(57) ABSTRACT

A low VOC clear coat composition which comprises an epoxy compound, a melamine component and an aliphatic polyisocyanate having an average of 2 to 6 isocyanate functionalities, and optionally contains a catalyst (e.g., organotin catalysts, acid catalysts and combinations); a polyhydroxyl functional compound (e.g., polycarbonate polyol); or other additives (e.g., light absorbers and light stabilizers). Also disclosed is an article coated with the clear coat composition, a process of making the composition, and a process of applying the composition to, for example, an automobile body.

42 Claims, No Drawings

U.S. PATENT DOCUMENTS

| | | | |
|---|---|---|---|
| 5,760,127 A | 6/1998 | Bammel et al. | 524/590 |
| 5,763,528 A | 6/1998 | Barsotti et al. | 525/63 |
| 5,837,795 A | 11/1998 | Lomoelder et al. | 528/62 |
| 5,853,809 A | 12/1998 | Campbell et al. | 427/387 |
| 5,872,195 A | 2/1999 | Green et al. | 525/481 |
| 5,886,125 A | 3/1999 | Huybrechts | 528/32 |
| 5,891,981 A | 4/1999 | Mauer et al. | 528/45 |
| 5,965,272 A | 10/1999 | Donnelly et al. | 528/28 |
| 5,994,469 A * | 11/1999 | December et al. | 525/181 |
| 6,013,326 A | 1/2000 | Flosbach et al. | 427/409 |
| 6,143,367 A | 11/2000 | Bartol et al. | 427/391 |
| 6,221,494 B1 | 4/2001 | Barsotti et al. | 525/131 |
| 6,592,944 B1 * | 7/2003 | Uhlianuk et al. | 427/385.5 |
| 6,605,356 B2 * | 8/2003 | Ouchi et al. | 428/418 |
| 6,607,833 B1 * | 8/2003 | Uhlianuk et al. | 428/447 |
| 6,635,314 B1 * | 10/2003 | William et al. | 427/385.5 |
| 6,680,122 B2 * | 1/2004 | Shigeo et al. | 428/413 |
| 6,734,260 B2 * | 5/2004 | Nishiguchi et al. | 525/405 |

* cited by examiner

HIGH SOLID EPOXY, MELAMINE AND ISOCYANATE COMPOSITIONS

This application is a § 371 of PCT/US00/06960 filed on Mar. 16, 2000 which claims benefit of U.S. Provisionals 60/124,850 filed on Mar. 17, 1999; 60/131,145 filed on Apr. 27, 1999; and 60/131,146 filed on Apr. 27, 1999.

BACKGROUND OF INVENTION

The present invention generally relates to high solids low VOC (volatile organic component) coating compositions and more particularly to low VOC clear coating compositions suited for multi-layered coatings used in automotive OEM and refinish applications.

Basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for clear coating formulations which provide an outstanding balance of performance characteristics after application, particularly solvent and mar and etch-resistance.

Examples of compositions used to form a protective coatings include those disclosed in U.S. Pat. No. 4,533,716 (Okoshi et al.). These compositions are prepared using a triazine-type resin formed by a co-condensation reaction with formaldehyde, a polyol, and as required a monohydric alcohol. The polyols used in the condensation reaction may be prepared by an esterification reaction between higher fatty acids and epoxy compounds having a number average molecular weight of 174 to 4,000. The polyols used in the U.S. Pat. No. 4,533,716 invention do not include epoxy compounds. The U.S. Pat. No. 4,533,716 coating compositions are disclosed to include a triazine-type resin and a polyisocianate.

The present invention is directed to a clear coating composition comprising isocyanate, melamine, and epoxy components wherein the isocyanate component comprises an aliphatic polyisocyanate having on an average 2 to 6 isocyanate functionalities.

The present invention is also directed to a method of producing a clear coating on a substrate comprising: applying a layer of a clear coating composition comprising isocyanate melamine, and epoxy components wherein the isocyanate component comprises an aliphatic polyisocyanate having on an average 2 to 6 isocyanate functionalities, and curing the layer into the clear coating.

One of the advantages of the present invention is its low VOC, significantly below the current guidelines of Environment Protection Agency (EPA) of the United States.

Another advantage is etch and mar resistance of the coating resulting from the coating composition of the present invention.

Yet another advantage is the clarity of the coating resulting from the coating composition of the present invention.

As used herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited potlife typically of minutes (5 minutes to 45 minutes) to a few hours (4 hours to 6 hours). The pot mix is applied as a layer of desired thickness on a substrate surface, such as an autobody. After application, the layer is cured under ambient conditions or cure-baked at elevated temperatures to form a coating on the substrate surface having desired coating properties, such as high gloss, mar-resistance and resistance to environmental etching.

"Low VOC coating composition" means a coating composition that includes less then 0.48 kilograms of organic solvent per liter (4 pounds per gallon) of the composition, as determined under the procedure provided in ASTM D3960.

"High solids composition" means a coating composition having solid component in the range of from 65 to 100 percent and preferably greater than 70 percent, all in weight percentages based on the total weight of the composition.

"Clear coating composition" means a clear coating composition that produces upon cure, a clear coating having DOI (distinctness of image) and 20° gloss of more than 70.

"Polymer solids" or "Composition solids" means a polymer or composition in its dry state.

"Aliphatic" as employed herein includes aliphatic and cycloaliphatic materials.

"Crosslinkable" means that the individual components of the adduct contain functionality which react within the composition of the invention to give a coating of good appearance, durability, hardness and mar resistance.

Applicants have unexpectedly discovered that contrary to conventional approaches used in typical thermoset coating compositions, i.e., those involving a film forming polymer and crosslinking component, a very viable route lies in a combination of what would traditionally be considered crosslinking agents for producing a unique low VOC high solids clear coating composition which provides coatings with superior properties, such as mar and etch resistance.

The clear coating composition includes isocyanate, melamine, and epoxy components. The isocyanate component includes an aliphatic polyisocyanate having on an average 2 to 6, preferably 2.5 to 6 and more preferably 3 to 4 isocyanate functionalities. The coating composition includes in the range of from 35 percent to 70 percent, preferably in the range of from 40 percent to 65 percent and more preferably in the range of from 45 percent to 60 percent of the aliphatic polyisocyanate, the percentages being in weight percentages based on the total weight of composition solids.

Examples of suitable aliphatic polyisocyanates include aliphatic or cycloaliphatic di-, tri- or tetra-isocyanates, which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, 1,3-cyclopentane diisocyanate, 1,2-cyclohexane diisocyanate, 1,4cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, meta-tetramethylxylylene diisocyanate, polyisocyanates having isocyanaurate structural units such as the isocyanurate of hexamethylene diisocyanate and isocyanurate of isophorone diisocyanate, the adduct of 2 moles of a diisocyanate, such as hexamethylene diisocyanate, uretidiones of hexamethylene diisocyanate, uretidiones of isophorone diisocyanate or isophorone diisocyanate, and one mole of a diol such as ethylene glycol, the adduct of 3 moles of hexamethylene diisocyanate and 1 mole of water (available under the trademark Desmodur N of Bayer Corporation, Pittsburgh, Pa. or Tolonate HDT-LV from Rhodia Co., Cranbury, N.J.). If desired, the isocyanate functionalities of the polymeric isocyanate may be capped with a monomeric alcohol, isopropanol or isobutanol to prevent premature crosslinking in a one-pack composition. Some suitable monomeric alcohols include methanol, ethanol, propanol, butanol and hexanol.

Some other suitable blockers include lactams, oximes, malonic esters, alkylacetoacetates, triazoles, pyrazoles (e.g. dimethyl pyrazole), phenols and amines. Compositions of the present invention include one or more melamine. A melamine used in the present invention includes, in part, alkylated melamine-formaldehyde resin. The alkylated melamine formaldehyde resin maybe partially or fully alkylated. As examples of partially alkylated melamines, Cymel 1158 Cymel 324, Cymen 327 (from Cytec Ind., from West Paterson, N.J.), Resimine BM 9539 (from Solutia, Inc., St. Louis, Mo.) can be mentioned. As examples of fully aklykated melamines, Cymel 350, and Cymel 301 (from Cytec Co., from Cytec. Ind., West Paterson, N.J.) and Resimine 764 (from Solutia Inc., St. Louis, Mo.) can be mentioned. A composition of the present invention may comprise from about 10 weight percent to about 40 weight percent of a melamine, preferably from about 15 weight percent to 35 weight percent of a melamine.

Compositions of the present invention include one or more oligomeric epoxy compounds, preferably containing at least two epoxy functionalities. Suitable oligomeric epoxy compounds containing a hydroxy functionality or (OH) group used in the practice of the present invention include, among others, sorbitol polyglycidyl ether such as DCE 358 (form Dixie Chemical Co., Houston, Tex.), diglycerol polyglycidy ether such as Denacol EX 421 (from Nagase Cehmical Co., Hyogo, Japan), glycerol polyglycidyl ether such as Denacol Ex 313 and EX 314 (from Nagase Chemical Co., Hyogo, Japan), and triglycidyl tris(2-hydroxyethyl) isocyanurate such as Denacol EX 421 (from Nagase Chemical Co., Hyogo, Japan). Suitable oligomeric epoxy compounds which typically do not contain significant hydroxy functionality used in the practice of the present invention include, among others, di- and polyglycidyl ethers of polycarboxylic acid and di- and polyglycidyl ester of acids such as Araldite CY 184 (from Ciba-Geigy, Brewster, N.Y.), cycloaliphatic epoxide such as ERL 4221 (from Union Carbide, Danbury, Conn.), and polyglycol diepoxide such as DER 736 (from Dow Chemical Co., Midland, Mich.). A composition of the present invention comprises from about 10 weight percent to about 40 weight percent of an epoxy compound, preferably from about 15 weight percent to 35 weight percent of an epoxy compound.

The coating composition preferably includes one or more catalysts to enhance crosslinking of the components on curing.

A preferable catalyst is an organotin catalyst such as dibutyltin dilaurate, dibutyltin diacetate, dibutyltin oxide, and dibutyltin bis(acetoacetate) in an amount of generally ranges from 0.001 percent to 1.0 percent, preferably from 0.01 percent to 0.5 percent and more preferably from 0.05 percent to 0.2 percent, the percentages being in weight percentages based on the total weight of composition solids.

In addition, the above coating composition can include other suitable catalysts, such as conventional acid catalysts, for example blocked or unblocked phosphoric acid and sulfonic acid in an amount ranging from 0.1 percent to 2 percent, preferably in the range of from 0.2 percent to 1.0 percent. As examples of such acid catalysts, phenyl acid phosphate, butyl acid phosphate, octyl acid phosphate, dodecylbenzenesulfonic acid, para-toluenesulfonic acid and dinonylnaphthalene sulfonic acid, which are optionally blocked with amines such as dimethyl oxazolidine and 2-amino-2-methyl-1-propanol can be mentioned.

The coating composition of the present invention, which is formulated into high solids coating systems may also contain at least one organic solvent typically selected from the group consisting of aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder. The amount of organic solvent used results in the composition having a VOC of less than 0.48 kilogram/liter (4 pounds per gallon), preferably in the range of 0.1 kilogram/liter to 0.4 kilogram/liter (1 pound to 3 pounds per gallon) of an organic solvent per liter of the composition.

The coating composition of the present invention may also contain conventional additives, such as, stabilizers, and rheology control agents, flow agents, and toughening agents. Such additional additives will, of course, depend on the intended use of the coating composition. Any additives that would adversely effect the clarity of the cured coating will not be included as the composition is used as a clear coating. The foregoing additives may be added to either component or both, depending upon the intended use of the coating composition.

To improve weatherability of the clear finish of the coating composition, about 0.1–5%, by weight, based on the weight of the composition solids, of an ultraviolet light stabilizer or a combination of ultraviolet light stabilizers may be added. These stabilizers include ultraviolet light absorbers, screeners, quenchers and specific hindered amine light stabilizers. Also, about 0.1–5% by weight, based on the weight of the composition solids, of an antioxidant can be added. Typical ultraviolet light stabilizers that are useful include benzophenones, such as hydroxydodecyclbenzophenone, 2,4-dihydroxybenzophenone; triazoles, such as 2-phenyl4-(2'-4'-dihydroxybenzoyi)triazoles; and triazines, such as 3,5-dialkyl-4-hydroxyphenyl derivatives of triazine and triazoles such as 2-(benzotriazole-2-yl)-4,6-bis (methylethyl-1-phenyl ethyl)phenol, 2-(3-hydroxy-3,5'-ditert amyl phenyl) benzotriazole, 2-(3',5'-bis(1,1-dimethylpropyl)-2'-hydroxyphenyl)-2H-benzotriazole, benzenepropanoic acid, 3-(2H-benzotriazol-2-yl)-5-(1,1-dimethylethyl)4-hydroxy-,C7-9-branched alkyl esters, and 2-(3',5'-bis(1-methyl-1-phenylethyl)-2'-hydroxyphenyl) benzotriazole.

Typical hindered amine light stabilizers are bis(2,2,6,6-tetramethylpiperidinyl)sebacate, bis(N-methyl-2,2,6,6-tetramethylpiperidinyl)sebacate and bis(N-octyloxy-2,2,6,6-tetramethylpiperidynyl)sebacate. Particularly useful blend of ultraviolet light absorbers and hindered amine light stabilizers is bis(N-octyloxy-2,2,6,6-tetramethylpiperidynyl)sebacate and benzenepropanoic acid, 3-(2H-benzotriazol-2-yl)-5(1,1-dimethylethyl) 4hydroxy-,C7-9-branched alkyl esters.

The coating composition of the present invention optionally contains, in the range of 0.5 weight percent to 15 weight percent, preferably 1 weight percent to 10 weight percent of polyhydroxy functional compounds such as polycarbonate polyol (formula shown in the example), 2-ethyl-1,3-hexanediol, polycaprolactone triol, and the adduct of epsilon caprolactone and 1,3,5-tris(2-hydroxyethyl) cyanuric acid, all percentages being based on the total weight composition solids.

The coating composition of the present invention optionally contains in the range of from 0.5 percent to 30 percent, preferably in the range of from 1 percent to 20 percent, stabilized crosslinked polymer particles, i.e., non-aqueous dispersion (NAD) (as described in detail in U.S. Pat. No. 4,960,828), all percentages being based on the total weight of composition solids.

The clear coating composition of the present invention may be supplied in the form of a two-pack coating composition in which a first pack includes the polyisocyanate and a second-pack includes the melamine, epoxy compounds and other additives.

Generally, the first and the second pack are stored in separate containers and mixed before use. The containers are preferably sealed air tight to prevent reactions during storage.

Alternatively, when the isocyanate functionalities of the polyisocyanate are blocked, all components of the composition can be stored in the same containers in the form of a one-pack coating composition.

In use, the first-pack of the two-pack coating composition containing the polyisocyanate and the second-pack containing the melamine, epoxy compounds, and other additiaves are mixed just prior to use for about 1 to 15 minutes before use to form a pot mix, which has limited pot life, in range of from 5 minutes to 6 hours, before it becomes too viscous to permit application through conventional application systems, such as spraying. Alternatively, the first pack and the second pack are mixed together at the plural spray gun with or without electrostastics, before applied to a substrate. Other methods of applications include roller coating, dipping or brushing and other conventional application methods. The layer of the coating composition then cures under ambient conditions or preferably at higher temperatures in the range of 80–160° C. for 10 minutes to 3 hours, preferably in the range of 20 minutes to 1 hour to form a coating on the substrate having the desired coating properties.

When the one-pack coating composition containing the blocked polyisocyanate is used, a layer thereof applied over a substrate using aforedescribed application techniques, is cured at a baking temperature in the range of from 80° C. to 200° C., preferably in the range of 80° C. to 160° C., for about 10 to 60 minutes It is understood that actual baking temperature would vary depending upon the catalyst and the amount thereof, thickness of the layer being cured, the blocked isocyanate functionalities and the melamine utilized in the coating composition. The use of the foregoing baking step is particularly useful under Original Equipment Manufature (OEM) condition.

It is understood that the actual curing time depends upon catalyst type and amount, the thickness of the applied layer and on the presence or absence of any suitable drying devices, such as, fans that assist in continuously flowing air over the coated substrate to accelerate the cure rate. Generally, a clearcoat layer having a thickness in the range of from 25 micrometers to 75 micrometers applied over a metal substrate, such as automotive body which is often precoated with other coating layers such as electrocoat, primer and basecoat; cures in 20 to 60 minutes at at about 80° C. to 160° C.

Testing Procedures

The following test procedures were used for generating data reported in the examples below:

| Test | Test Method |
| --- | --- |
| Dry film thickness | ASTM D1400 |
| Appearance | ASTM D523, VISUAL |
| 20° Gloss | ASTM D523 |
| DOI | ASTM D5767 |
| Tukon Hardness | ASTM D1474 |
| Mar resistance | ASTM D5178 |
| Percent solids | ASTM D2369 |

EXAMPLE

The following non-limiting examples will further illustrate the invention. All parts, percentages, ratios, etc., in the examples are by weight unless otherwise indicated. The following abbreviations listed in Table 1 are used throughout. The examples below are carried out using standard techniques, which are well known and routine to those skilled in the art, except where otherwise described in detail. These examples are illustrative, but do not limit the invention.

Definitions

| | |
| --- | --- |
| ARALDITE CY 184 | Oligomeric, Epoxy Resin, 100% Solid (Ciba-Geigy, Brewster, NY) |
| CYMEL 1158 | Polymeric Melamine, 80% Solid (Cytec Co., West Paterson, NJ) |
| TINUVIN 384 | Ultraviolet Light Screener, 100% Solid (Ciba-Geigy, Tarrytown, NY) |
| TINUVIN 292 | Hindered Amino Light Stabilizer (Ciba-Geigy, Tarrytown, NY) |
| BYK 301 | Flow Additive (Byk Chemie USA, Wallingford, CT) |
| Dibutyltin Dilaurate | Catalyst (from Air Products, Allentown, PA) |
| Phenyl Acid Phosphate | Catalyst (from Albright & Wilson Co., Glen Allen, VA) |
| 2-Ethylhexyl Acetate | Solvent (from Eastman Chemical Co., Kingsport, TN) |
| TOLONATE HDT-LV | Isocyanate Timer, 100% Solid (from Rhodia Inc., Cranbury, NJ) |
| CYMEL 350 | Monomeric Melamine 100% Solid (Cytec Co. West Paterson, NJ) |
| ERL 4221 | Oligomeric Epoxy resin, 100% solid (Union Carbide, Danbury, CT) |
| Dodecylbenzenesulfonic acid salt of amionethyl-proponol | Catalyst (Kings Industry, Norwork, CT) |
| DER 736 | Oligomeric Epoxy Resin, 100% solid (Dow Chemical Co. Midland, MI) |

Synthesis Example 1 Synthesis of Polycarbonate PL1015

A 5 liter round bottom flask was fitted with stirrer, condenser, heating mantle, thermometer, and Dean Stark trap. To the reactor were charged 402.5 gm tromethylolpropane, 501.6 gm neopentylglycol, 567.2 gm 1,6-hexanediol, 1063.2 gm diethylcarbonate, and 0.2 gm dibutyltindilaurate (all available from Aldrich Chemicals, Milwaukee, Wis.). The mixture was slowly heated under agitation until ethanol began to distill off at approximately 120° C. Temperature was allowed to slowly increase to 140° C. Distillation continued at 140° C. for a total of 16 hours until 829.3 gm ethanol were removed. The material was then cooled and 89.8 gm methylamyl ketone was added. The reaction yielded 1707.2 grams of polycarbonate polyol at 94.2% weight percent solids.

Protective Coating Example 1

Part A was prepared by combining the following ingredients: 20 parts of ARALDITE CY 184; 25 parts of CYMEL 1158; 2.0 parts of TINUVIN 384; 1.5 parats of TINUVIN 292; 0.68 parts of a solution comprising 10 weight percent of BYK 301 in propylene monoetheyl ether acetate; 5.0 parts of a solution of 1 weight percent of dibutyltin dilaurate in butyl acetate; 0.67 parts of a solution of 75 weight percent of phenyl acid phosphate in butanol; 2.0 parts of PL1015, and 5.26 parts of 2-ethylhexyl acetate. This mixture was then combined with 54.7 parts of TOLONATE HDT-LV as a part B to form a clear composition.

Separately, a steel substrate, which had been precoated with electrocoat and primer was coated with a conventional waterborne bascoat to a thickness of 15 micron and prebaked at 82° C. for 10 minutes. Then, the above clear composition was sprayed over the above prebaked waterborne basecoat and baked at 140° C. for 30 minutes.

The substrate was cooled and Protective Coating 1 was tested. Characteristics of Protective Coating 1 are illustrated in Table 1 as compared to a characteristics of Control Protective Coating (conventional 2K isocyanate/acrylic polyol clear composition which had been prepared similarly).

TABLE 1

CHARACTERISTICS OF PROTECTIVE COATINGS

| sample | Protective Coating 1 | Control Coating [acrylic polyol/iso) |
|---|---|---|
| % Solid | 85.6 | 53.0 |
| VOC (lbs/gal) | 1.29 | 3.9 |
| #4 Ford spray viscosity (sec) | 100 | 30 |
| Gloss (20 deg.) | 95 | 89 |
| DOI | 97 | 97 |
| Tukon hardness (Knoop) | 13.3 | 11.1 |
| Cleveland humidity (96 hour @ 60 C.) | | |
| Tape adhesion | No failure | No failure |
| Blister | No | No |
| Boiling water resistance (3 h) | | |
| Tape adhesion | No failure | No failure |
| blister | No | No |
| Gravel @ –20 deg. C. (Note 1) | 7 | 6 |
| Percent gloss retention after dry mar (note 2) | 96 | 91 |
| Min. temp. (C.) without spot of synthetic acid rain soln. | 65 | 60 |

(Note 1) Rating based on 1–10 with 10 best
(Note 2) Gloss retention after 10 rubbing cycles using an abrasive material As shown in Table 1, Clearcoat Example 1 clearly showed good appearance at very low VOC and gave good physical properties.

Protective Coating Example 2

Protective Coating 2 was prepared as follows: Parts A was prepared by combining 22.0 parts of ARALDITE CY 184, 25.0 parts of CYMEL 1158, 2.0 parts of TINUVIN 384, 1.5 parts of TINUVIN 292, 0.68 parts of a solution of 10 weight percent of BYK 301 in propylene ethyl ether acetate, 5.0 parts of a solution of 1 weight percent dibutyltin dilaurate in butyl acetate, 0.67 parts of a solution of 75 weight percent of phenyl acid phosphate in butanol and 5.26 parts of 2-ethylhexyl acetate. The above part A mixture was then combined with 54.7 parts of TOLONATE HDT-LV as a part B to form a clear composition. The composition had a solid content of 85.6 weight percent, and a volatile organic compounds concentration of 1.29 lbs/gal. (0.15 Kg/liter).

The composition was then sprayed over a conventional silver metallic waterborne basecoat which had been applied to the similar substrate as described in Example 1 and prebaked at 82° C. for 10 minutes, and baked at 140° C. for 30 minutes similar to Example 1. The coating exhibited gloss 95, DOI 95 and Tukon hardness 11.3.

Protective Coating Example 3

Protective Coating 3 was prepared as follows: Part A was prepared by mixing20.0parts of ARALDITE CY 184, 12.5 parts of CYMEL 1158, 10.0 parts of CYMEL 350, 2.0 parts of TINUVIN 384, 1.5 parts of TINUVIN 292, 0.68 parts of a solution of 10 weight percent of BYK 301 in propylene monoetheyl ether acetate, 0.5 parts of a solution of 10 weight percent of dibutyltin dilaurate in Butyl acetate, 0.67 parts of a solution of 75 weight percent of phenyl acid phosphate in butanol, 2.0 parts of PL1015 and 10.26 parts of 2-ethylhexyl acetate. This part A mixture was then combined with 54.7 parts of TOLONATE HDT-LV as part B to form a clear composition. The clear composition had a solid content of 87.1 weight percent, and a volatile organic compounds concentration of 1.18 lbs/gal. (0.14 Kg/liter).

The composition was then sprayed over a conventional silver metallic waterborne basecoat which had been applied to the similar substrate as described in Example 1 and prebaked at 82° C. for 10 minutes, and baked at 140° C. for 30 minutes similar to Example 1. The coating exhibited gloss 94, DOI 94 and Tukon hardness 11.4.

Protective Coating Example 4

Protective Coating 4 was prepared as follows: Part A was prepared by mixing 20 parts of ERL 4221, 25 parts of CYMEL 1158, 2.0 parts of TINUVIN 384, 1.5 parts of TINUVIN 292, 0.68 parts of a solution of 10 weight percent of BYK 301 in propylene monoethyl ether acetate, 0.5 parts of a solution of 10 weight percent dibutyltin dilaurate in butyl acetate, 1.4 parts of dodecylbenzenesulfonic acid salt of amionethylpropanol, 2.0 parts of PL 1015, and 5.26 parts of 2-ethylhexyl acetate. This part A mixture was then combined with 54.7 parts of TOLONATE HDT-LV as a part B to form a clear composition. The clear composition had a solid content of 88.44 weight percent, and a volatile organic compounds concentration of 1.05 lbs/gal (0.12 Kg/liter).

The composition was then sprayed over a conventional silver metallic waterborne basecoat which had been applied to the similar substrate as described in Example 1 and prebaked at 82° C. for 10 minutes, and baked at 140° C. for 30 minutes similar to Example 1. The coating exhibited gloss 90, DOI 90 and Tukon hardness 4.6.

Protective Coating Example 5

Protective Coating 5 was prepared as follows: Part A was prepared by mixing 20.0 parts of DER 736 20.0 parts of CYMEL 350, 2.0 parts of TINUVIN 384, 1.5 parts of TINUVIN 292, 0.68 parts of a solution of 10 weight percent BYK 301 in propylene monoetheyl ether acetate, 6.0 parts of the salt of dodecylbenzenesulfonic acid and diethanolamine, 4.2 parts of PL 1015 and 6.75 parts of 2-Ethylhexyl Acetate. This part A mixture was then combined with 52.5 parts of TOLONATE HDT-LV as a part B to form a clear composition. The composition had solid content of 88.0 weight percent, and a volatile organic compounds concentration of 1.09 lbs/gal.(0.13 Kilograms/liter).

The composition was then sprayed over a conventional silver metallic waterborne basecoat which had been applied to the similar substrate as described in Example 1 and prebaked at 82° C. for 10 minutes, and baked at 140° C. for 30 minutes similar to Example 1. The coating exhibited gloss 87, DOI 90 and Tukon hardness 3.6.

The complete disclosures of all patents, patent applications, and publications are incorporated herein by reference as if individually incorporated. Various modifications and alterations of this invention will become apparent to those skilled in the art without departing from the scope and spirit of this invention, and should be understood that this invention is not to be unduly limited to the illustrative embodiments set forth herein.

What we claim is:

1. A low VOC clear coating composition comprising isocyanate, epoxy compound and melamine components wherein said isocyanate component comprises an aliphatic polyisocyanate having an average of 2 to 6 isocyanate functionalities.

2. The composition of claim 1 wherein said composition further comprises a catalyst.

3. The composition of claim 2 wherein said catalyst is selected from the group consisting of an organotin catalyst, acid catalyst and combinations thereof.

4. The composition of claim 3 wherein said organotin catalyst is selected from the group consisting of dibutyltin diacetate, dibutyltin dilaurate, dibutyltin oxide, dibutyltin bis(acetoacetate) and combinations thereof.

5. The composition of claim 3, wherein said acid catalyst is selected from the group consisting of phenyl acid phosphate, butyl acid phosphate, octyl acid phosphate, dodecylbenzenesulfonic acid, paratoluenesulfonic acid, dinonylnaphthalenesulfonic acid and combinations thereof.

6. The composition of claim 3 or 5, wherein said acid catalyst is blocked with an amine.

7. The composition of claim 6, wherein said amine is dimethyloxazolidine, 2-amino-2-methyl-1-propanol, di(2-hydroxyethyl)amine or a combination thereof.

8. The composition of claim 6, wherein said composition comprises about 0.001 weight percent to about 3.0 weight percent of catalyst, all percentages based on the total weight of composition solid.

9. The composition of claim 2,3,4, or 5 wherein said composition comprises about 0.001 weight percent to about 3.0 weight percent of catalyst, all percentages based on the total weight of composition solid.

10. The composition of claim 1 further comprises a polyhydroxyl functional compound.

11. The composition of claim 10 wherein said polyhydroxyl functional compound is a polycarbonate polyol.

12. The composition of claim 10 or 11 wherein said polyhydroxyl functional compound comprises from about 0.5 weight percent to about 15 weight percent of the composition.

13. The composition of claim 1 further comprises a non-aqueous dispersion resin.

14. The composition of claim 1, wherein said epoxy compound is selected from the group consisting of a polyglycidyl ester of an acid, a polyfunctional aliphatic epoxy compound, a cycloaliphatic epoxy compound, a polyfunctional cycloaliphatic epoxy compound or combinations thereof.

15. The composition of claim 1, or 14, wherein said epoxy compound comprises from about 10 weight percent to about 40 weight percent of the composition.

16. The composition of claim 1 or 14, wherein said epoxy compound is a di or polyglycidyl ester of a di or polycarboxylic acid.

17. The composition of claim 16, wherein said epoxy compound comprises from about 10 weight percent to about 40 weight percent of the composition.

18. The composition of claim 1, wherein said melamine is a fully alkylated melamine-formaldehyde resin.

19. The composition of claim 1, wherein said melamine is a partially alkylated melamine-formaldehyde resin.

20. The composition of claim 1, 18 or 19, wherein said melamine compound comprises from about 10 weight percent to about 40 weight percent of the composition.

21. The composition of claim 1 further comprises ultraviolet light absorbers, light stabilizers or a combination thereof.

22. The composition of claim 1, wherein said aliphatic polyisocyanate is selected from the group consisting of timers of hexamethylene diisocyanate, isophome diisocyanate, or meta-tetramethylene diisocyanate and combinations thereof.

23. The composition of claim 1 or 22, wherein said aliphatic polyisocyanate is blocked.

24. The composition of claim 23, wherein aliphatic polyisocyanate is blocked by reacting with an aliphatic mono-alcohol.

25. The composition of claim 23, wherein said aliphatic polyisocyanate comprises from about 35 weight percent to about 70 weight percent of the composition.

26. The composition of claim 1, or 22, wherein aliphatic polyisocyanate is blocked by reacting with an aliphatic mono-alcohol.

27. The composition of claim 1, or 22, wherein said aliphatic polyisocyanate comprises from about 35 weight percent to about 70 weight percent of the composition.

28. The composition of claim 1 further comprises a solvent.

29. The composition of claim 1, wherein said composition has a solids content of greater than 65 weight percent.

30. A composition of claim 1, wherein said composition has a solids content of greater than 80 weight percent.

31. An article comprising a substrate having a first and a second major surface and a layer of protective coating, the protective coating comprising a hardened composition of claim 1.

32. The article of claim 31, wherein said substrate is selected from the group consisting of metal, plastic, wood and rubber.

33. The article of claim 31, wherein said layer of protective coating has a thickness of about 25 micrometers to about 75 micrometers.

34. The article of claim 31, wherein said layer of protective coating is acid-resistant.

35. The article of claim 31, wherein said layer of protective coating is transparent.

36. The article of claim 31, comprising a layer of electrocoat, primer and a layer of basecoat interposed between the substrate and the layer of protective coating.

37. A process of making a clear coating composition that upon hardening forms a clear protective coating comprising the steps of:

combining an aliphatic polyisocyanate having an average of 2 to 6 isocyanate functionalities an epoxy compound, and melamine.

38. A process of making a clear coating composition that upon hardening forms a protective coating comprising the steps of:

making a first mixture comprising an epoxy, a melamine;

making a second mixture comprising an aliphatic polyisocyanate having an average of 2 to 6 isocyanate functionalities; and combining the first and second mixtures.

39. The process of claim 38, wherein said first mixture, second mixture or both mixtures contain a solvent.

40. A clear coating composition produced by the process of claim 38.

41. A process of making an article comprising the steps of:

applying a clear coating composition comprising an aliphatic polyisocyanate having an average of 2 to 6 isocyanate functionalities, an epoxy compound, and melamine to a substrate; and hardening the composition.

42. The process of claim 41, wherein said composition is applied by spraying.

* * * * *